United States Patent
Bahr et al.

(10) Patent No.: US 11,876,617 B1
(45) Date of Patent: Jan. 16, 2024

(54) SYSTEMS AND METHODS FOR AUTOMATIC MANAGEMENT OF A WIRELESS ACCESS POINT

(71) Applicant: Cable Television Laboratories, Inc., Louisville, CO (US)

(72) Inventors: John C. Bahr, Superior, CO (US); Lili Hervieu, Buford, GA (US); Joshua F. Redmore, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 209 days.

(21) Appl. No.: 17/643,771

(22) Filed: Dec. 10, 2021

Related U.S. Application Data

(60) Provisional application No. 63/151,181, filed on Feb. 19, 2021, provisional application No. 63/123,549, filed on Dec. 10, 2020.

(51) Int. Cl.
| | | |
|---|---|---|
| *H04L 1/00* | (2006.01) | |
| *H04W 24/04* | (2009.01) | |
| *H04W 52/22* | (2009.01) | |
| *H04W 52/24* | (2009.01) | |
| *H04W 52/14* | (2009.01) | |

(52) U.S. Cl.
CPC ........... *H04L 1/0003* (2013.01); *H04W 24/04* (2013.01); *H04W 52/221* (2013.01); *H04W 52/241* (2013.01); *H04W 52/143* (2013.01)

(58) Field of Classification Search
CPC ..... H04L 1/0003; H04L 25/497; H04L 25/49; H04L 1/0014; H04L 67/565; H04L 1/0076; H04L 1/1819; H04L 41/0816; H04L 67/34; H04L 41/5009; H04L 1/1867; H04W 24/04; H04W 52/221; H04W 52/241; H04W 52/143; H04W 28/0221; H04W 52/0245; H04W 28/18; H04W 52/16; H04W 52/246; H04W 36/14; H04W 52/362; H04W 24/02; H04W 4/00; H04B 7/06; H04B 7/15528; H04B 2203/5479

See application file for complete search history.

(56) References Cited

U.S. PATENT DOCUMENTS

| | | | |
|---|---|---|---|
| 7,949,342 B2* | 5/2011 | Cuffaro | H04W 52/241 |
| | | | 455/452.2 |
| 9,699,708 B2* | 7/2017 | Alexander | H04W 52/143 |
| 9,913,239 B2* | 3/2018 | Tinnakornsrisuphap | |
| | | | H04W 24/02 |
| 9,913,285 B2* | 3/2018 | Li | H04W 52/246 |
| 11,234,244 B2* | 1/2022 | Kung | H04B 7/06 |
| 2016/0285611 A1* | 9/2016 | Fischer | H04W 16/14 |
| 2020/0005656 A1* | 1/2020 | Saunamaki | H04L 25/49 |
| 2020/0288455 A1* | 9/2020 | Dillon | H04W 24/02 |
| 2021/0385671 A1* | 12/2021 | Kerpez | H04W 24/04 |

\* cited by examiner

*Primary Examiner* — Lana N Le
(74) *Attorney, Agent, or Firm* — PdZ Patent Law, PLLC

(57) ABSTRACT

A method for automatic management of a wireless access point includes (a) changing a minimum modulation coding scheme of the wireless access point from a first minimum modulation coding scheme to a second minimum modulation coding scheme; (b) determining a first change in performance of the wireless access point in response to changing the minimum modulation coding scheme; and (c) in response to the first change in performance of the wireless access point meeting a first threshold condition, continuing to operate the wireless access point in the second minimum modulation coding scheme.

20 Claims, 11 Drawing Sheets

SYSTEMS AND METHODS FOR AUTOMATIC MANAGEMENT OF A WIRELESS ACCESS POINT

CROSS REFERENCE TO RELATED APPLICATIONS

This application claims benefit of priority to (a) U.S. Provisional Patent Application Ser. No. 63/123,549, filed on Dec. 10, 2020, and (b) U.S. Provisional Patent Application Ser. No. 63/151,181, filed on Feb. 19, 2021. Each of the aforementioned patent applications is incorporated herein by reference.

BACKGROUND

Wireless access points are widely used to provide communication services. Examples of wireless access points include, but are not limited to, Wi-Fi wireless access points and cellular wireless access points. It is common to have multiple wireless access points in a small area. For example, each household in a multifamily residential building may have a wireless access point in its home within the building. As another example, each tenant in a commercial building may have a wireless access point in its leased space. Additionally, larger residences and businesses often have multiple wireless access points to help achieve full wireless communication coverage.

DETAILED DESCRIPTION OF THE EMBODIMENTS

Figure 1:
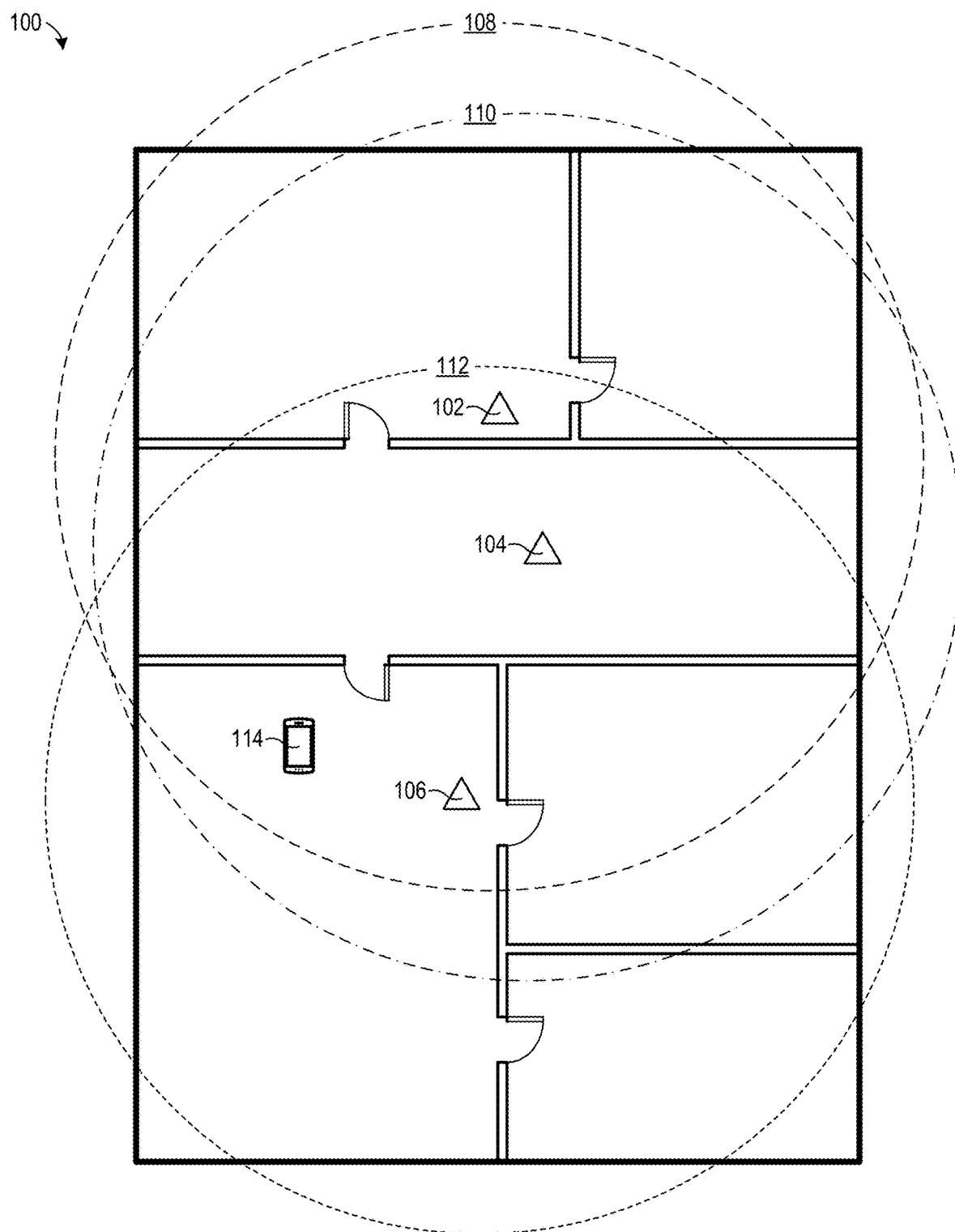
FIG. 1 is an illustration of building floor plan including wireless access points with overlapping coverage areas.

Presence of multiple wireless access points in a small area may result in overlapping coverage of the wireless access points. For example, FIG. 1 is an illustration of a building floor plan 100 including three wireless access points 102, 104, and 106 having respective coverage areas 108, 110, and 112. As evident from FIG. 1, coverage areas 108, 110, and 112 substantially overlap. Although coverages areas 108, 110, and 112 are illustrated as having circular shapes, actual coverage areas may be, and often will be, non-circular. For example, walls and other building features may attenuate radio frequency signals, such that wireless access points 102, 104, and 106 have irregular coverage areas. As another example, wireless access points 102, 104, and 106 may have non-isotropic antennas which cause them to have non-circular coverage areas. Irrespective of coverage area shape, coverage areas 108, 110, and 112 are likely to overlap due to the proximity of wireless access points 102, 104, and 106 to each other.

Overlapping wireless access point coverage areas can be beneficial because they help ensure continuous coverage. However, overlapping wireless access point coverage areas also have drawbacks. For example, two wireless access points with overlapping coverage areas may interfere with each other. As another example, overlapping wireless access point coverage areas may result in a wireless client device being served by a neighboring wireless access point instead of being served by a home wireless access point. For instance, assume that wireless access point 106 is intended to serve wireless clients in its immediate vicinity, such as a wireless client 114. Wireless client 114 might instead be served by wireless access point 102 or wireless access point 104, due to coverage areas 108 and 110 of these two wireless access points overlapping with coverage area 112 of wireless access point 106.

Accordingly, it is generally desirable that wireless access point coverage areas be no larger than necessary to adequately serve their intended wireless clients. Locations of large cellular wireless access points, such as macrocells and microcells, are generally carefully selected during a site survey to achieve desired coverage areas and to minimize interference between neighboring wireless access points. However, locations of Wi-Fi wireless access points and smaller cellular wireless access points, such as nanocells and picocells, are often chosen without considering possible interaction with neighboring wireless access points. For example, each household in a multifamily residential building may locate its respective wireless access point based on convenience and/or aesthetics, without consideration of how the wireless access point may interact with wireless access points of other households in the building. As such, there is significant potential for overlapping coverage areas of smaller wireless access points, such as Wi-Fi wireless access points, nanocell cellular wireless access points, and picocell cellular wireless access points.

Coverage of a wireless access point can typically be manually adjusted. However, many users lack knowledge required to manually adjust a wireless access point, particularly such that its coverage area is optimized. Additionally, a network operator may be reluctant to manually decrease coverage area of a wireless access point in fear of inadvertently impairing user experience. Consequently, smaller wireless access points frequently operate with larger than necessary coverage areas.

Disclosed herein are systems and methods for automatic management of a wireless access point which at least partially overcome the problems discussed above. Certain embodiments of the new systems and methods help achieve an optimum coverage area of a wireless access point by automatically adjusting one or more parameters of the wireless access point, e.g., minimum modulation coding scheme and/or transmission power, to achieve adequate wireless access point performance without unnecessarily large wireless access point coverage area. Therefore, the new systems and methods may significantly improve wireless access point operation in applications with two or more wireless access points in a small area.

For example, some embodiments are configured to automatically change one or more parameters, such as minimum modulation coding scheme and/or transmission power, of a wireless access point over time and at a particular duty cycle, to test different parameter values to determine whether they provide adequate coverage to wireless clients without adversely affecting wireless access point performance. In these embodiments, the wireless access point (and/or a controlling entity) determines whether a change in a parameter value should be made permanent, i.e., made a new baseline value, based on whether the change in the parameter value positively or negatively affected wireless access point performance. In particular, if the change in the parameter value resulted in a positive change in wireless access point performance, the change is made permanent. On the other hand, if the change in the parameter value resulted in a negative change in wireless access point performance, the wireless access point reverts to the previous parameter value. In some embodiments, this method repeats from time-to-time, e.g., on a periodic basis, with a different change to one of more wireless access point parameters, such that the wireless access point converges toward optimum values of the one or more parameters.

Figure 2:
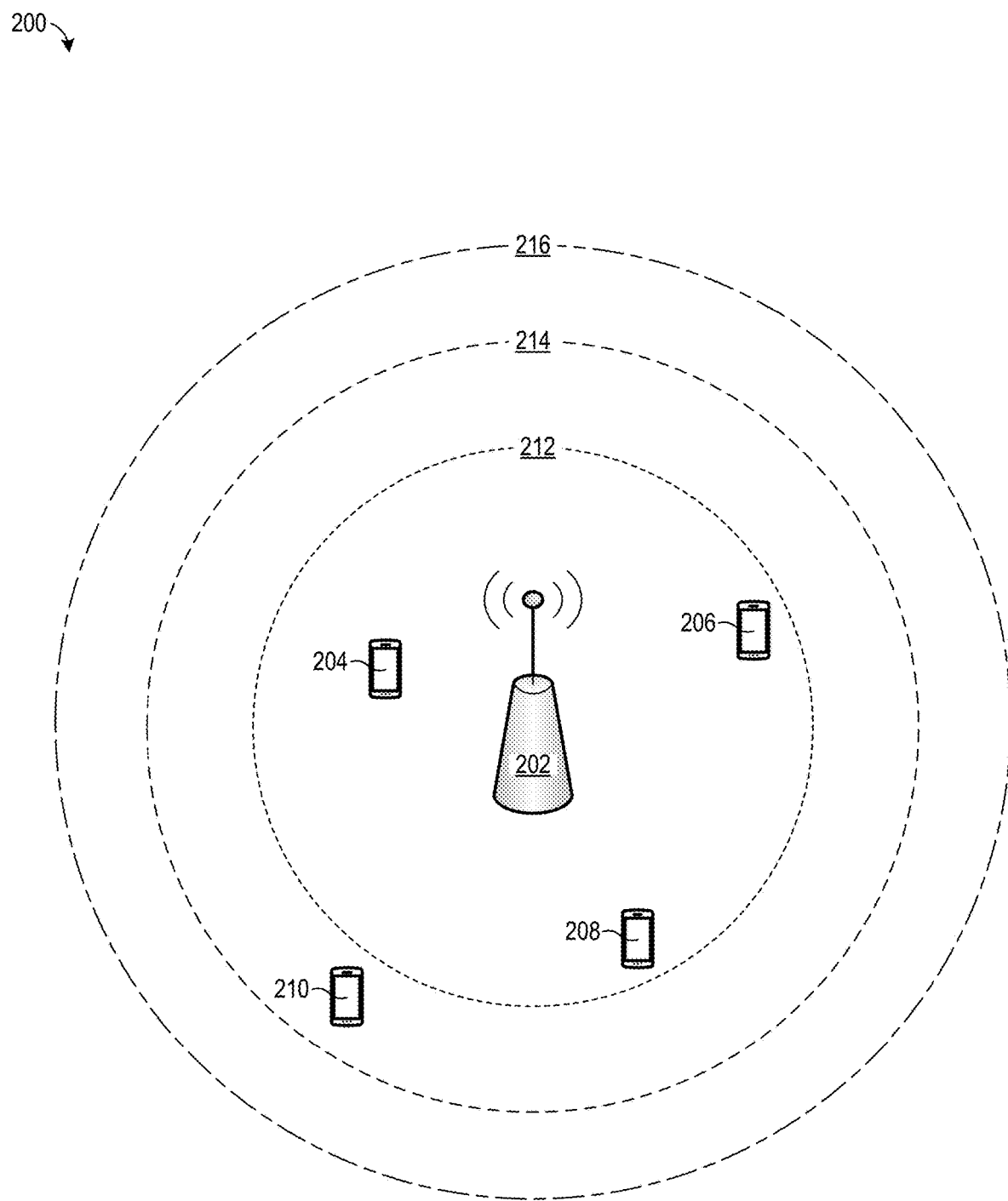
FIG. 2 is a block diagram of a wireless communication environment including a system for automatic management of a wireless access point, according to an embodiment.

FIG. 2 is a block diagram of a wireless communication environment 200 including a wireless access point 202 and wireless clients 204, 206, 208, and 210. As discussed below, wireless access point 202 includes an embodiment of the disclosed systems for automatic management of a wireless access point. The number of wireless access points and wireless clients in wireless communication environment 200 may vary without departing from the scope hereof. Additionally, although wireless clients 204, 206, 208, and 210 are depicted as being mobile telephones, one or more wireless clients could be a different type of wireless client, including but not limited to, a computer, a set-top device, a data storage device, an Internet of Things (IoT) device, an entertainment device, a computer networking device, a smartwatch, a wearable device with wireless capability, a medical device, a security device, a monitoring device, a wireless access device, etc.

Figure 3:
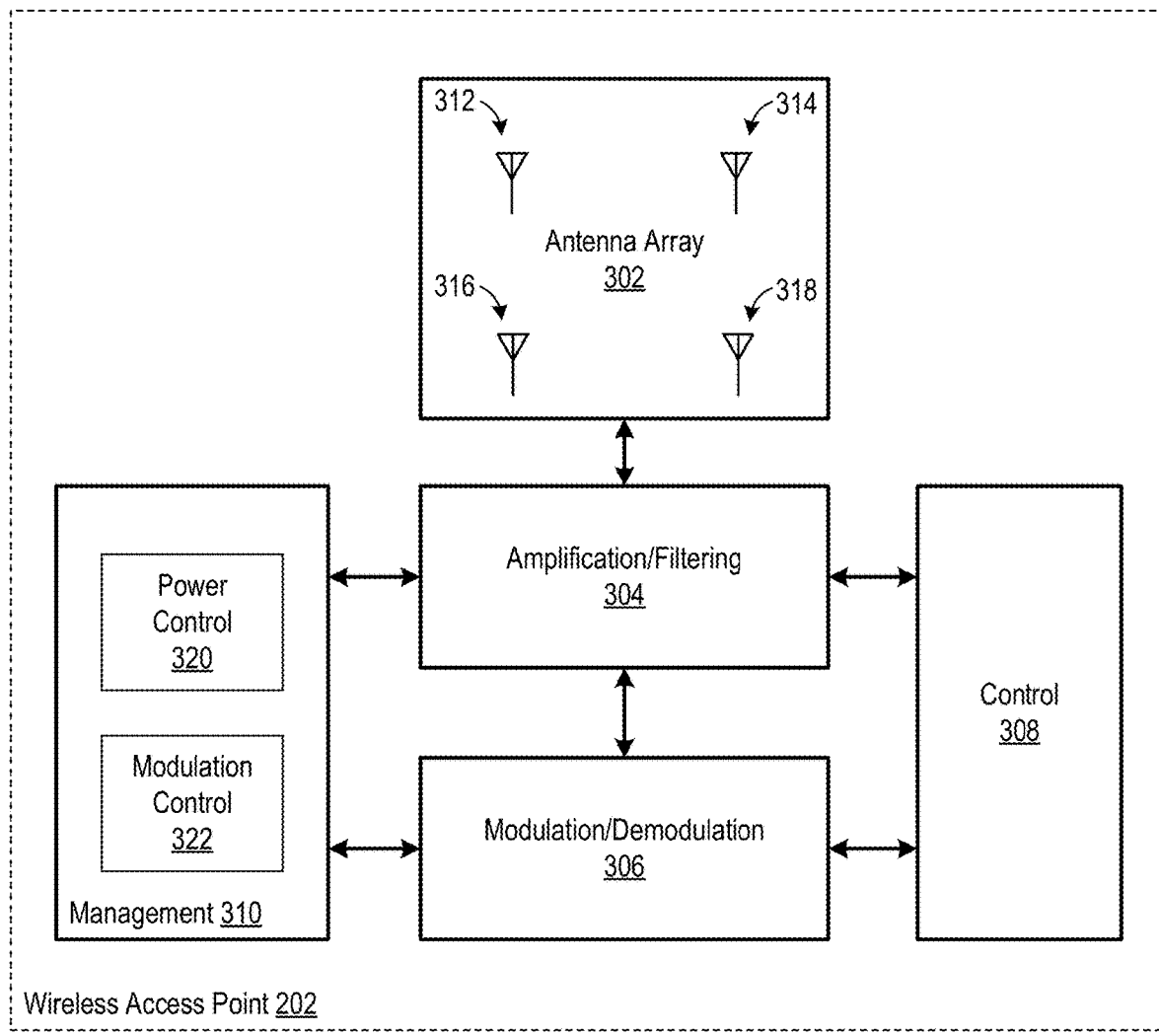
FIG. 3 is a block diagram of a wireless access point of the FIG. 2 wireless communication environment, according to an embodiment.

FIG. 3 is a block diagram of wireless access point 202 depicted in more detail than as depicted in FIG. 2. FIGS. 2 and 3 are best viewed together in the following discussion. Wireless access point 202 includes an antenna array 302, an amplification/filtering module 304, a modulation/demodulation module 306, a control module 308, and a management module 310. Modules 304, 306, 308, and 310 are formed, for example, of analog and/or digital electronic circuitry. For example, in some embodiments, one or more of modules 304, 306, 308, and 310 are at least partially implemented by a processor (not shown) executing instructions, such as in the form of software and/or firmware, stored in a data store (not shown). While antenna array 302 and modules 304, 306, 308, and 310 are depicted as being separate elements, two or more of these elements could be partially or fully combined. For example, in certain embodiments, control module 308 and management module 310 are implemented by common hardware. Additionally, one of more of modules 304, 306, 308, and 310 could be remote from wireless access point 202 without departing from the scope hereof. For example, control module 308 and/or management module 310 could be at least partially implemented by a central controller configured to control a plurality of wireless access points.

Antenna array 302 includes antenna elements 312, 314, 316, and 318 that are configured to convert communication signals between the electrical domain and the wireless domain. For example, antenna elements 312, 314, 316, and 318 are configured to convert downlink communication signals from the electrical domain to the wireless domain for transmission to wireless clients 204, 206, 208, and/or 210. As another example, antenna elements 312, 314, 316, and 318 are configured to convert uplink communication signals received from wireless clients 204, 206, 208, and/or 210 from the wireless domain to the electrical domain. The number of antenna elements in antenna array 302 may vary. Additionally, antenna array 302 could be replaced with a single antenna element without departing from the scope hereof.

Amplification/filtering module 304 is configured to amplify communication signals in the electrical domain, such as to achieve a desired transmission power of wireless access point 202. Amplification/filtering module 304 is also configured to filter communication signals in the electrical domain, such as to remove noise from the communication signals. Modulation/demodulation module 306 is configured to modulate a carrier signal according to a downlink data signal, and modulation/demodulation module 306 is further configured to demodulate a communication signal received from antenna array 302 to recover an uplink data signal. While not required, one or both of modules 304 and 306 may be further configured to convert electrical signals between the analog domain and digital domain. For example, modulation/demodulation module 306 may operate in the digital domain, and amplification/filtering module 304 may be further configured to (1) convert downlink signals in the digital domain to the analog domain before amplification and (2) convert uplink signals received from antenna array 302 from the analog domain to the digital domain.

Control module 308 is configured to control at least amplification/filtering module 304 and modulation/demodulation module 306, such as to implement one or more of wireless channel control, modulation control, radio frequency spectrum sharing, error checking and error correction, wireless client authentication, coordination with other wireless access points and/or a central controller, etc. In some embodiments, control module 308 is configured to control modules 304 and 306 such that wireless access point 202 operates according to a Wi-Fi communication protocol (e.g., an Institute of Electrical and Electronics Engineers (IEEE) 802.11-based communication protocol), a cellular communication protocol (e.g., a Long Term Evolution (LTE)-based communication protocol, a Fifth Generation (5G)-based communication protocol, and/or a Sixth Generation (6G)-based communication protocol), or extensions, modifications, or successors of any of the foregoing communication protocols.

Management module 310 is an embodiment of the systems for automatic management of a wireless access point disclosed herein. Accordingly, management module 310 is configured to automatically adjust one or more parameters of wireless access point 202 to achieve adequate wireless access point 202 performance without unnecessarily large wireless access point coverage area. In some embodiments, management module 310 is configured to adjust minimum modulation coding scheme and/or transmission power, and management module 310 is accordingly depicted as including a modulation control submodule 322 and a power control submodule 320. However, management module 310 could be configured to adjust different and/or additional parameters of wireless access point 202 without departing from the scope hereof.

FIG. 2 illustrates wireless access point 202 as having three possible wireless coverage areas 212, 214, and 216, where coverage area 212 is the smallest coverage area and coverage area 216 is the largest coverage area. However, wireless access point 202 may have a different number of coverage areas without departing from the scope hereof. For example, some embodiments of wireless access point 202 can achieve numerous possible coverage areas by adjusting a combination of minimum modulation coding scheme and transmission power. Additionally, while coverage areas 212, 214, and 216 are depicted as having a circular shape for illustrative simplicity, actual shape of coverage areas 212, 214, and 216 may vary, such as for reasons analogous to those discussed above with respect to the shape of coverage areas in FIG. 1.

In some embodiments, modulation control submodule 322 of management module 310 is configured to control wireless access point 202 to achieve a highest possible minimum modulation coding scheme (MCS) while still realizing adequate performance of wireless access point 202. Minimum modulation coding scheme of wireless access point 202 is the lowest-order modulation coding scheme that wireless access point 202 will permit for use when communicating with a wireless client, such as wireless clients 204, 206, 208, and 210. For example, assume that (1) an embodiment of wireless access point 202 supports modulation coding schemes MCS 0, MCS 1, MCS 2, MCS 3, MCS 4, MCS 5, MCS 6, and MCS 7, and (2) wireless access point 202 is currently configured with a minimum modulation coding scheme of MCS 2. In this example scenario, wireless access point 202 will permit use of any one of modulation coding schemes MCS 2 through MCS 7 to communicate with a wireless client, but wireless access point 202 will prohibit use of modulation coding schemes MCS 0 or MCS 1 to communicate with a wireless client, even though wireless access point 202 supports modulation coding schemes MCS 0 and MCS 1. It should be appreciated that wireless access point 202 is not limited to supporting MCS coding schemes MCS 0 through MCS 7, and wireless access point 202 could accordingly support additional modulation coding schemes, fewer modulation coding schemes, and/or alternative modulation coding schemes.

Maximum bandwidth generally increases with increasing modulation coding scheme due to higher-order modulation coding schemes being capable of using radio frequency spectrum more efficiently than lower-order modulation coding schemes. However, wireless access point coverage area size generally decreases with increasing modulation coding scheme, due to higher-order modulation coding schemes necessitating higher signal to noise ratios than lower-order modulation coding schemes. Consequently, coverage area of wireless access point 202 may be adjusted by changing its minimum modulation coding scheme, but such adjustment may also affect performance of the wireless access point. In particular, increasing minimum modulation coding scheme of wireless access point 202 may cause clients that cannot support the new minimum modulation coding scheme (e.g., due to their location) to disassociate from wireless access point 202 or switch to a different frequency band (e.g., from 5 gigahertz (GHz) to 2.4 GHz) when communicating with wireless access point 202. Additionally, increasing minimum modulation coding scheme of wireless access point 202 may increase wireless communication retries. On the flip side, reducing the minimum modulation coding scheme of wireless access point 202 may reduce communication retries and/or allow clients that were previously unable to associate with wireless access point 202 to now associate with the wireless access point. Accordingly, increasing minimum modulation coding scheme of wireless access point 202 will decrease size of its coverage areas, e.g., from coverage area 214 to coverage area 212 in FIG. 2, but increasing the minimum modulation coding scheme may negatively impact performance of the wireless access point. For example, wireless client 210 may no longer be able to associate with wireless access point 202 if its coverage area is decreased from coverage area 214 to coverage area 212.

Figure 4A:
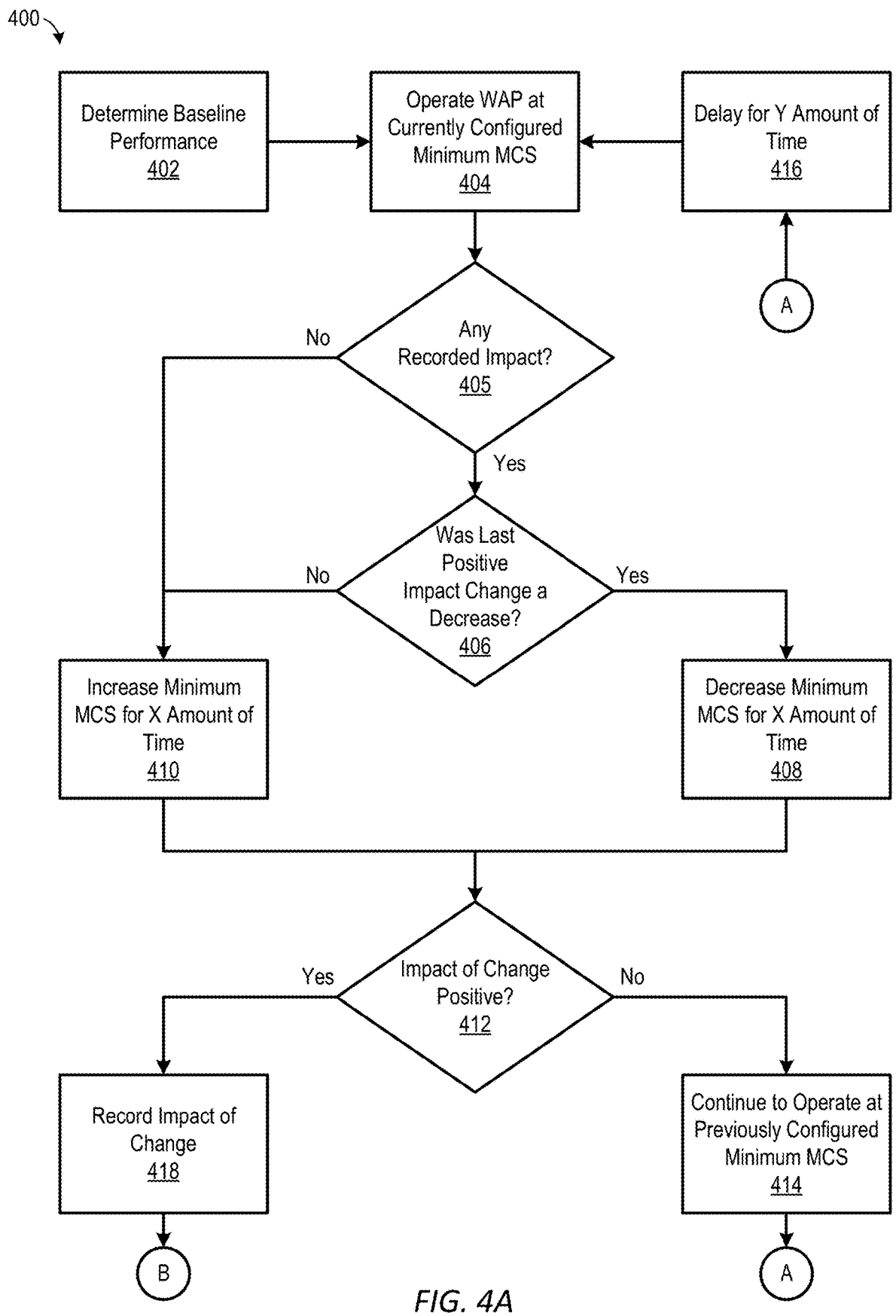
FIGS. 4A and 4B are a flow chart of a method for automatic management of a wireless access point by adjusting minimum modulation coding scheme, according to an embodiment.
Figure 4B:
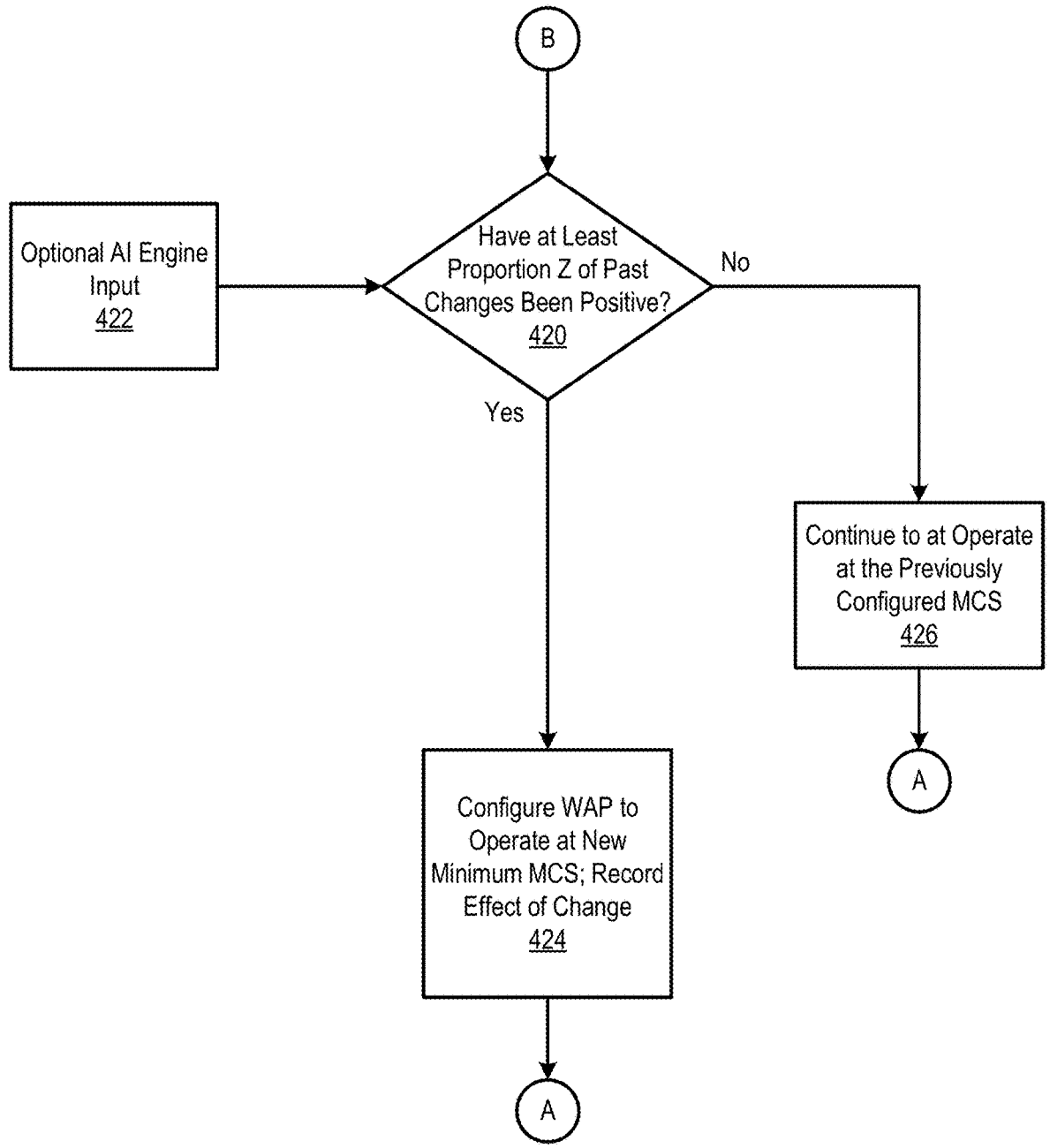

Some embodiments of wireless access point 202 are configured to execute method 400 of FIGS. 4A and 4B, which is a method for automatic management of a wireless access point by adjusting minimum modulation coding scheme. Method 400 may advantageously enable wireless access point 202 to achieve a balance between a high-order minimum modulation coding scheme and adequate performance. In a block 402 of method 400, management module 310 analyzes performance of wireless access point 202 for a predetermined time duration, e.g., for a predetermined number of hours or days after startup, to determine baseline performance of wireless access point 202. For example, management module 310 may determine an average number of wireless clients associated with wireless access point 202 and/or average data transmission rate of clients associated with wireless access point 202.

In a block 404 of method 400, management module 310 causes wireless access point (WAP) 202 to operate at its currently configured minimum modulation coding scheme. Additionally, management module 310 clears any recorded impact of change in performance of wireless access point 202 resulting from a change in minimum modulation coding scheme if wireless access point 202 is already operating at its lowest supported minimum modulation coding scheme. In a decision block 405, management module 310 determines whether there is any recorded impact from a last change in minimum modulation coding scheme. If the result of decision block 405 is no, method 400 proceeds to block 410 (discussed below), and if the result of decision block 405 is yes, method 400 proceeds to a decision block 406. In decision block 406, management module 310 determines whether the last change in minimum modulation coding scheme of wireless access point 202 that had a positive impact on its performance was a decrease in minimum modulation coding scheme (instead of an increase in minimum modulation coding scheme). If the result of decision block 406 is yes, method 400 proceeds to a block 408, and if the result of decision block 406 is no, method 400 proceeds to a block 410.

In block 408, management module 310 causes wireless access point 202 to decrease its minimum modulation coding scheme for X amount of time and then revert to the previous minimum modulation coding scheme. For example, assume that wireless access point 202 is currently operating at minimum modulation control scheme MCS 2. Management module 310 may cause wireless access point 202 to decrease its minimum modulation coding scheme from MCS 2 to MCS 1 for X amount of time and then revert to MCS 2, in block 408. In block 410, in contrast, management module 310 causes wireless access point 202 to increase its minimum modulation coding scheme for X amount of time and then revert to the previous minimum modulation coding scheme. For example, assume that wireless access point 202 is currently operating at minimum modulation control scheme MCS 1. Management module 310 may cause wireless access point 202 to increase its minimum modulation coding scheme from MCS 1 to MCS 2 for X amount of time and then revert to MCS 1, in block 410. As discussed below with respect to a block 416, value X of blocks 408 and 410 may be selected to achieve a desired duty cycle of change in minimum modulation coding scheme.

Method 400 proceeds from block 408 or block 410 to a decision block 412. In decision block 412, management module 310 determines whether the most-recent change in minimum modulation coding scheme of wireless access point 202, i.e., performed in either block 408 or block 410, had a positive impact on performance of the wireless access point. Criteria considered by management module 310 when determining whether the change had a positive impact on performance are implementation dependent. However, some possible criteria include, but are not limited to, change in number of wireless clients associated with wireless access point 202, bandwidth of communication links between wireless access point 202 and wireless clients, frequency bands used by wireless clients to communicate with wireless access point 202, number of wireless communication retries, etc. For example, management module 310 may determine that a change in minimum modulation coding scheme of wireless access point 202 had a positive impact on the wireless access point's performance if at least predetermined number of wireless clients previously associated with the wireless access point remain associated with the wireless access point. As another example, management module 310 may determine that a change in minimum modulation coding scheme of wireless access point 202 had a positive impact on the wireless access point's performance if average bandwidth of communication links between wireless access point 202 and wireless clients increased by at least a predetermined amount.

If the result of decision block 412 is no, method 400 proceeds to a block 414, where management module 310 causes wireless access point 202 to continue to operate at its previously configured modulation coding scheme. Consequently, the temporary change made to minimum modulation coding scheme in block 408 or block 410 for X amount of time is not further pursued. Method 400 proceeds from block 414 to block 416 (discussed below). On the other hand, if the result of decision block 412 is yes, method 400 proceeds to block 418 where management module 310 records the impact of the change to minimum modulation coding scheme on wireless access point 202's performance.

Method 400 proceeds from block 418 to a decision block 420 where management module 310 determines whether at least a proportion Z of past changes to minimum modulation coding scheme of wireless access point 202 have been positive. The value of proportion Z is implementation dependent. For example, Z may be set relatively large if it is desired that management module 310 be conservative in changing minimum modulation coding scheme of wireless access point 202. On the flip side, Z may be set relatively small if it is desired that management module 310 be aggressive in changing minimum modulation coding scheme of wireless access point 202.

Management module 310 optionally considers input 422 from an artificial intelligence (AI) engine in decision block 420 (and/or in one or more other blocks of method 400). The AI engine, when implemented, monitors wireless access point 202 and/or a network including wireless access point 202 and provides input 422 to supplement logic of management module 310, such as when executing decision block 420. For example, the AI engine may determine based on network activity when it is best to test a change in minimum modulation coding scheme. For instance, the AI engine may determine that a particular time is ideal to test a change in minimum modulating coding scheme because there is typically a wide variety of wireless client types associated with wireless access point 202 at this time. As another example, the AI engine may determine that the minimum modulation coding scheme of wireless access point 202 could possibly be increased, or that the minimum modulation coding scheme of wireless access point 202 should be lowered, based on actual and/or predicted wireless client behavior. For instance, the AI engine may determine that the minimum modulation coding scheme of wireless access point 202 should be decreased during a particular time frame because wireless clients tend to located near the edge of wireless access point 202's coverage area during this time frame.

If the result of decision block 420 is yes, method 400 proceeds to a block 424 where management module 310 causes wireless access point 202 to to operate at the new minimum modulation coding scheme tested in block 408 or 410. In other words, management module 310 causes the new minimum modulation coding scheme tested in block 408 or block 410 to be a new baseline minimum modulation coding scheme. Management module 310 optionally also records the effects on the change to minimum modulation coding scheme on performance of wireless access point 202, in block 424. Method 400 proceeds from block to block 416 (discussed below).

If the result of decision block 420 is no, method 400 proceeds to block 426 where management module 310 causes wireless access point 202 to continue to operate at its previously configured minimum modulation coding scheme. In other words, the temporary change made to minimum modulation coding scheme in either block 408 or block 410 for X amount of time is not further pursued.

Method 400 proceeds from block 426 to block 416 where management module 310 waits for Y amount of time before returning to block 404. Value X (blocks 408 and 410) and value Y (block 416) collectively define a duty cycle D=X/(X+Y) of changes/excursions to minimum modulation coding scheme of wireless access point 202, neglecting time required to execute other blocks of method 400. Stated differently, management module 310 repeatedly changes minimum modulation coding scheme of wireless base station 202 at a duty cycle of D, in method 400. The value of duty cycle D is implementation dependent and can be modified by adjusting the value of X and/or the value of Y.

Figure 5:
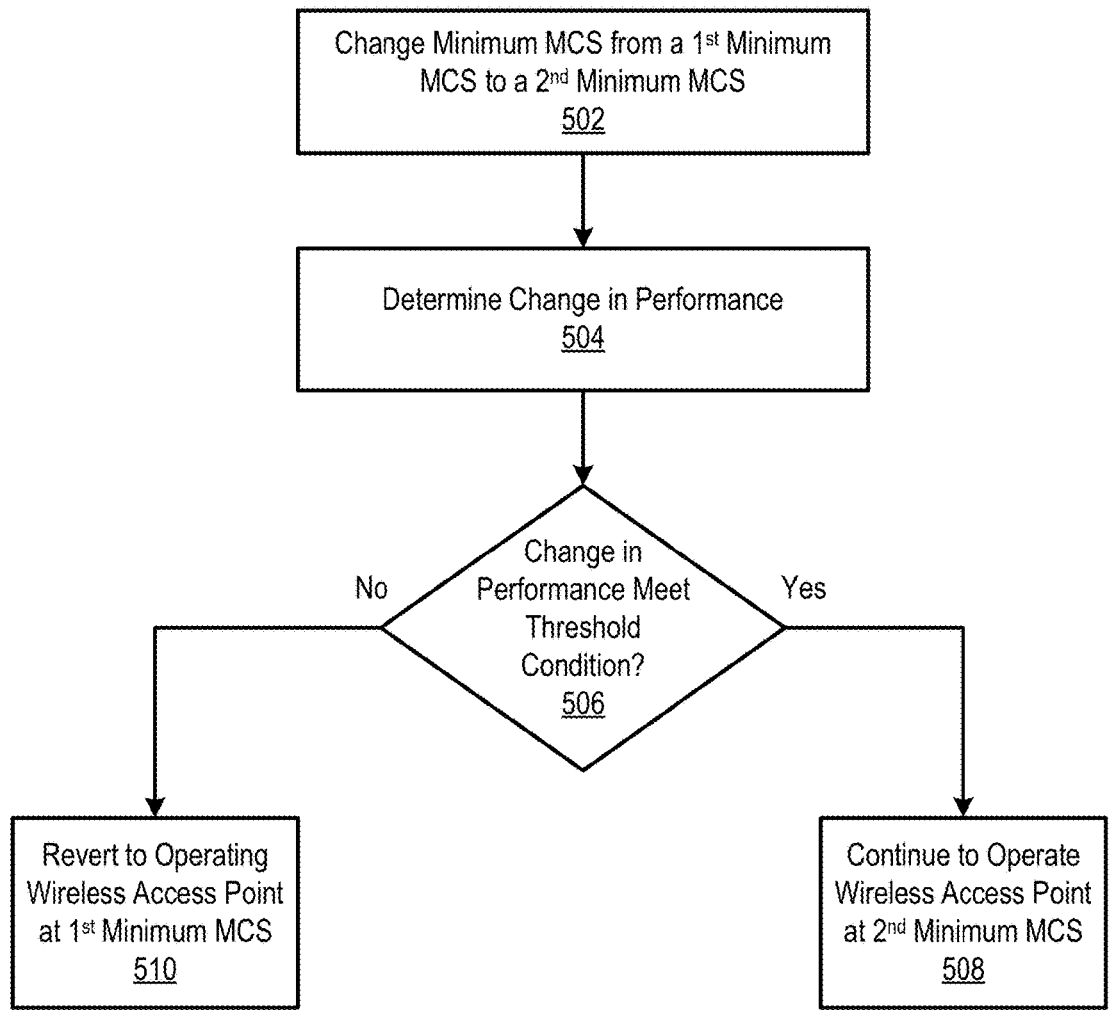
FIG. 5 is a flow chart of another method for automatic management of a wireless access point by adjusting minimum modulation coding scheme, according to an embodiment.

FIG. 5 is a flow chart of a method 500, which is another method for automatic management of a wireless access point by adjusting minimum modulation coding scheme. Method 500 is executed by some embodiments of wireless access point 202. In a block 502 of method 500, management module 310 changes the minimum modulation coding scheme of wireless access point 202 from a first minimum modulation coding scheme ($1^{st}$ minimum MCS) to a second minimum modulation coding scheme ($2^{nd}$ minimum MCS). In some embodiments, the $2^{nd}$ minimum MCS is a higher order modulation coding scheme than the $1^{st}$ minimum MCS, while in some other embodiments, the $2^{nd}$ minimum MCS is a lower order modulation coding scheme than the $1^{st}$ minimum MCS.

In a block 504 of method 500, management module 310 determines a change in performance of wireless access point 202 in response to the change in minimum modulation coding scheme of wireless access point 202 performed in block 502. Examples of block 504 include, but are not limited to, management module 310 determining one or more of (a) change in number of clients associated with wireless access point 202, (b) change in bandwidth of wireless communication links between wireless access point 202 and wireless clients, (c) change in frequency band of wireless communication links between wireless access point 202 and wireless clients, and (d) change in number of wireless communication retries. Management module 310 may evaluate performance of wireless access point 202 and/or its associated network for a predetermined amount of time in block 504, to determine change in performance of wireless access point 202 resulting from the change of block 502.

In a decision block 506 of method 500, management module 310 determines whether the change in performance determined in block 504 meets a threshold condition. Possible examples of the threshold condition include, but are not limited to, one or more of the change in performance determined in block 504 being positive, change in number of wireless clients associated with wireless access point 202 not decreasing by more than a predetermined amount, change in bandwidth of wireless communication links between wireless access point 202 and wireless clients increasing by at least a predetermined amount, and/or no change in frequency bands of wireless communication links.

If the result of decision block 506 is yes, method 500 proceeds to block 508 where management module 310 continues to operate wireless access point 202 at the $2^{nd}$ minimum MCS, such that the $2^{nd}$ minimum MCS is a new baseline minimum MCS. If the result of decision block 506 is no, method 500 proceeds to block 510, where management module 310 causes wireless access point 202 to revert to the $1^{st}$ minimum MCS. Method 500 optionally repeats by returning from block 508 or 510 to block 502, after an optional delay analogous to that of block 416 of FIG. 4A. Such optional delay in returning to block 502, along with monitoring time of block 504, may be set to cause management module 310 to change minimum modulation coding scheme of wireless access point 202 at a predetermined duty cycle, in a manner similar to that discussed above with respect to block 416.

Referring again to FIG. 3, in some embodiments, power control submodule 320 of management module 310 is configured to control wireless access point 202 to achieve a lowest possible transmission power while still realizing adequate performance of wireless access point 202. Coverage area of wireless access point 202 generally increases with increasing transmission power. Consequently, coverage area of wireless access point 202 may be adjusted by changing its transmission power. For example, coverage area of wireless access point 202 may be decreased by decreasing transmission power, but such adjustment may also affect performance of the wireless access point. In particular, decreasing transmission power of wireless access point 202 may cause clients to disassociate from wireless access point 202 or switch to a lower-order modulation coding scheme when communicating with wireless access point 202. Additionally, decreasing transmission power of wireless access point 202 may increase wireless communication retries. On the flip side, increasing power of wireless access point 202 may reduce communication retries and/or allow clients that were previously unable to associate with wireless access point 202 to now associate with the wireless access point. Accordingly, decreasing transmission power of wireless access point 202 will decrease size of its coverage areas, e.g., from coverage area 214 to coverage area 212 in FIG. 2, but decreasing the transmission power may negatively impact performance of the wireless access point. For example, wireless client 210 may no longer be able to associate with wireless access point 202 if its coverage area is decreased from coverage area 214 to coverage area 212.

Figure 6A:
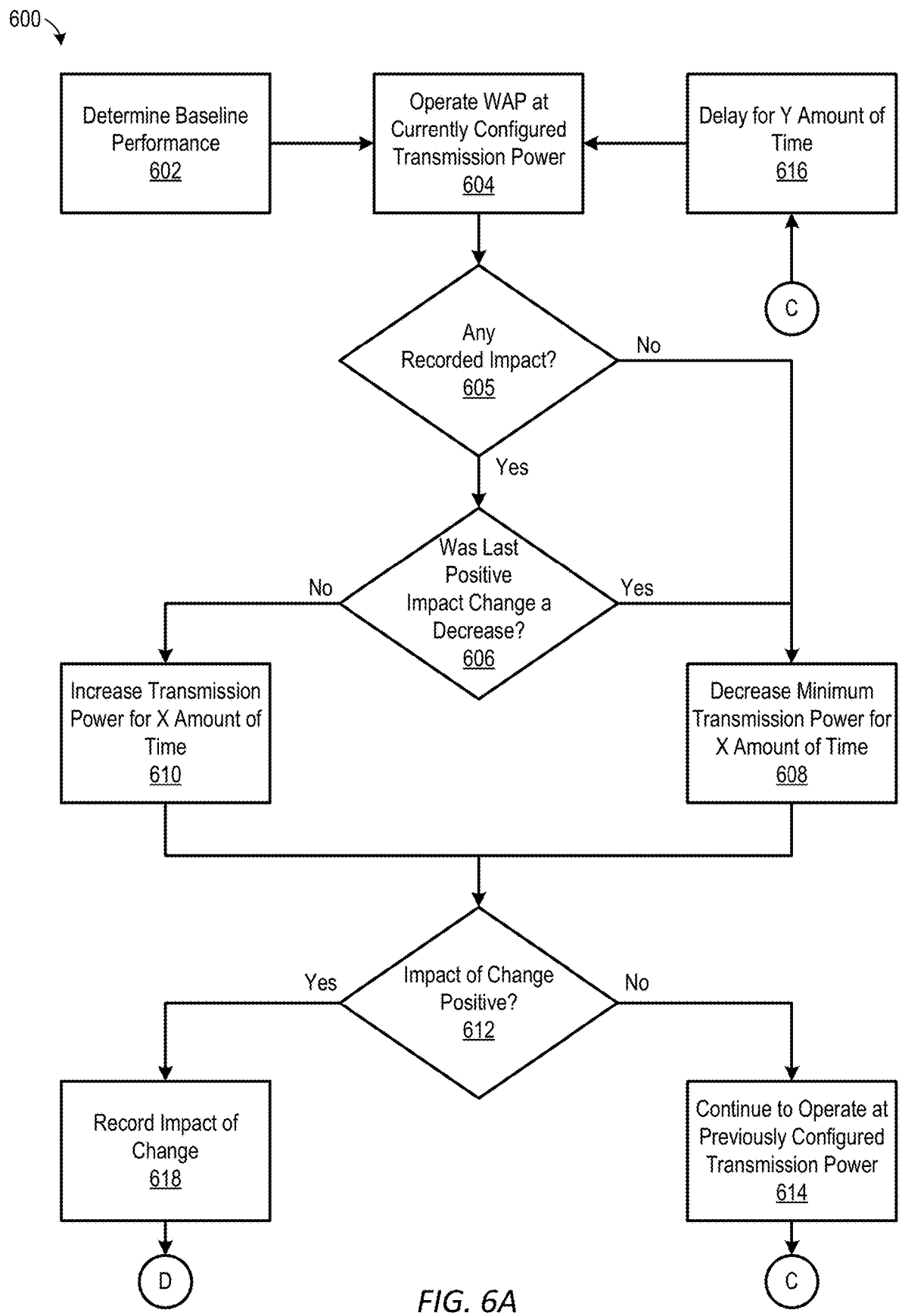
FIGS. 6A and 6B are a flow chart of a method for automatic management of a wireless access point by adjusting transmission power, according to an embodiment.
Figure 6B:
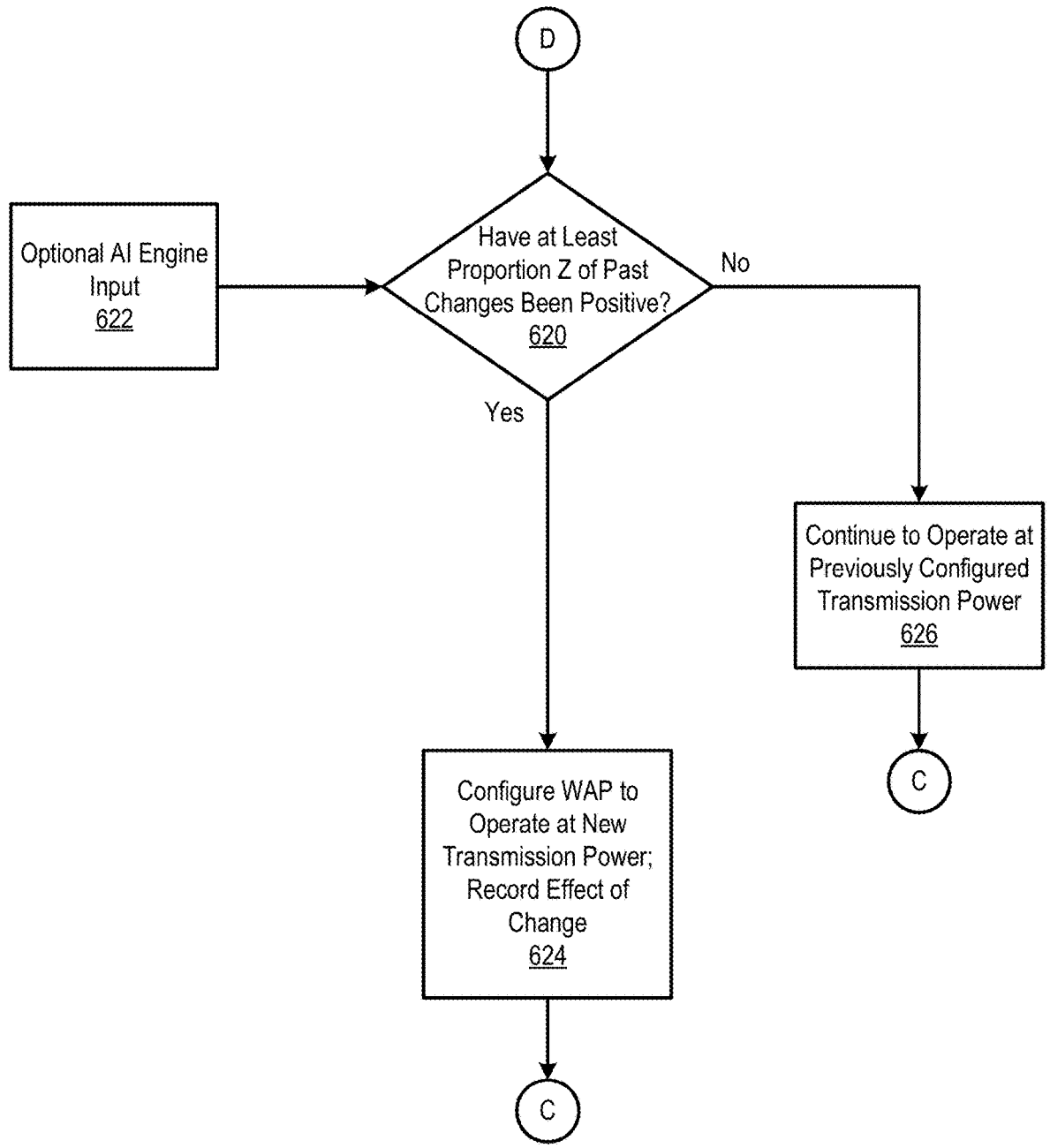

Some embodiments of wireless access point 202 are configured to execute method 600 of FIGS. 6A and 6B, which is a method for automatic management of a wireless access point by adjusting transmission power. Method 600 may advantageously enable wireless access point 202 to achieve a balance between low transmission power and adequate performance. In a block 602 of method 400, management module 310 analyzes performance of wireless access point 202 for a predetermined time duration, e.g., for a predetermined number of hours or days after startup, to determine baseline performance of wireless access point 202. For example, management module 310 may determine an average number of wireless clients associated with wireless access point 202 and/or average data transmission rate of clients associated with wireless access point 202.

In a block 604 of method 600, management module 310 causes wireless access point 202 to operate at its currently configured transmission power. Additionally, management module 310 clears any recorded impact of change in performance of wireless access point 202 resulting from a change in transmission power if wireless access point 202 is already operating at its highest supported transmission power. In a decision block 605, management module 310 determines whether there is any recorded impact from a last change in transmission power. If the result of decision block 605 is no, method 600 proceeds to block 608, and if the result of decision block 605 is yes, method 600 proceeds to a decision block 606. In decision block 606, management module 310 determines whether the last change in transmission power of wireless access point 202 that had a positive impact on its performance was a decrease in transmission power (instead of an increase in transmission power). If the result of decision block 606 is yes, method 400 proceeds to a block 608, and if the result of decision block 606 is no, method 600 proceeds to a block 610.

In block 608, management module 310 causes wireless access point 202 to decrease its transmission power for X amount of time and then revert to the previous transmission power. In block 610, in contrast, management module 310 causes wireless access point 202 to increase its transmission power for X amount of time and then revert to the previous transmission power. As discussed below with respect to a block 616, value X of blocks 608 and 610 may be selected to achieve a desired duty cycle of change in transmission power.

Method 600 proceeds from block 608 or block 610 to a decision block 612. In decision block 612, management module 310 determines whether the most-recent change in transmission power of wireless access point 202, i.e., performed in either block 608 or block 610, had a positive impact on performance of the wireless access point. Criteria considered by management module 310 when determining whether the change had a positive impact on performance are implementation dependent. However, some possible criteria include, but are not limited to, change in number of wireless clients associated with wireless access point 202, change in bandwidth of communication links between wireless access point 202 and wireless clients, frequency bands used by wireless clients to communicate with wireless access point 202, number of wireless communication retries, etc. For example, management module 310 may determine that a change in transmission power of wireless access point 202 had a positive impact on the wireless access point's performance if at least predetermined number of wireless clients previously associated with the wireless access point remain associated with the wireless access point. As another example, management module 310 may determine that a change in transmission power of wireless access point 202 had a positive impact on the wireless access point's performance if average bandwidth of communication links between wireless access point 202 and wireless clients did not decrease by more than a predetermined amount.

If the result of decision block 612 is no, method 600 proceeds to a block 614, where management module 310 causes wireless access point 202 to continue to operate at its previously configured transmission power. Consequently, the temporary change made to transmission power in block 608 or block 610 for X amount of time is not further pursued. Method 600 proceeds from block 614 to block 616 (discussed below). On the other hand, if the result of decision block 612 is yes, method 600 proceeds to block 618 where management module 310 records the impact of the change to transmission power on wireless access point 202's performance Method 600 proceeds from block 618 to a decision block 620 where management module 310 determines whether at least a proportion Z of past changes to transmission power of wireless access point 202 have been positive. The value of proportion Z is implementation dependent. For example, Z may be set relatively large if it is desired that management module 310 be conservative in changing transmission power of wireless access point 202. On the flip side, Z may be set relatively small if it is desired that management module 310 be aggressive in changing transmission power of wireless access point 202.

Management module 310 optionally considers input 622 from an AI engine in decision block 620 (and/or in one or more other blocks of method 600) in a manner similar to that discussed above with respect to FIGS. 4A and 4B. For example, the AI engine may determine based on network activity when it is best to test a change in transmission power. For instance, the AI engine may determine that a particular time is ideal to test a change in transmission power because there is typically a wide variety of wireless client types associated with wireless access point 202 at this time. As another example, the AI engine may determine that the transmission power of wireless access point 202 could possibly be lowered, or that the transmission power of wireless access point 202 should be raised, based on actual and/or predicted wireless client behavior. For instance, the AI engine may determine that the transmission power of wireless access point 202 should be increased during a particular time frame because wireless clients tend to located near the edge of wireless access point 202's coverage area during this time frame.

If the result of decision block 620 is yes, method 600 proceeds to a block 624 where management module 310 causes wireless access point 202 to continue to operate at the new transmission power tested in block 608 or 610. In other words, management module 310 causes the new transmission power tested in block 608 or block 610 to be a new baseline transmission power. Management module 310 optionally also records the effects on the change to transmission power on performance of wireless access point 202, in block 624. Method 600 proceeds from block to block 616 (discussed below).

If the result of decision block 620 is no, method 600 proceeds to block 626 where management module 310 causes wireless access point 202 to continue to operate at its previously configured transmission power. In other words, the temporary change made to transmission power in either block 608 or block 610 for X amount of time is not further pursued.

Method 600 proceeds from block 626 to block 616 where management module 310 waits for Y amount of time before returning to block 604. Value X (blocks 608 and 610) and value Y (block 616) collectively define a duty cycle D=X/(X+Y) of changes/excursions to transmission power of wireless access point 202, neglecting time required to execute other blocks of method 600. Stated differently, management module 310 repeatedly changes transmission power of wireless base station 202 at a duty cycle of D, in method 600. The value of duty cycle D is implementation dependent and can be modified by adjusting the value of X and/or the value of Y.

Figure 7:
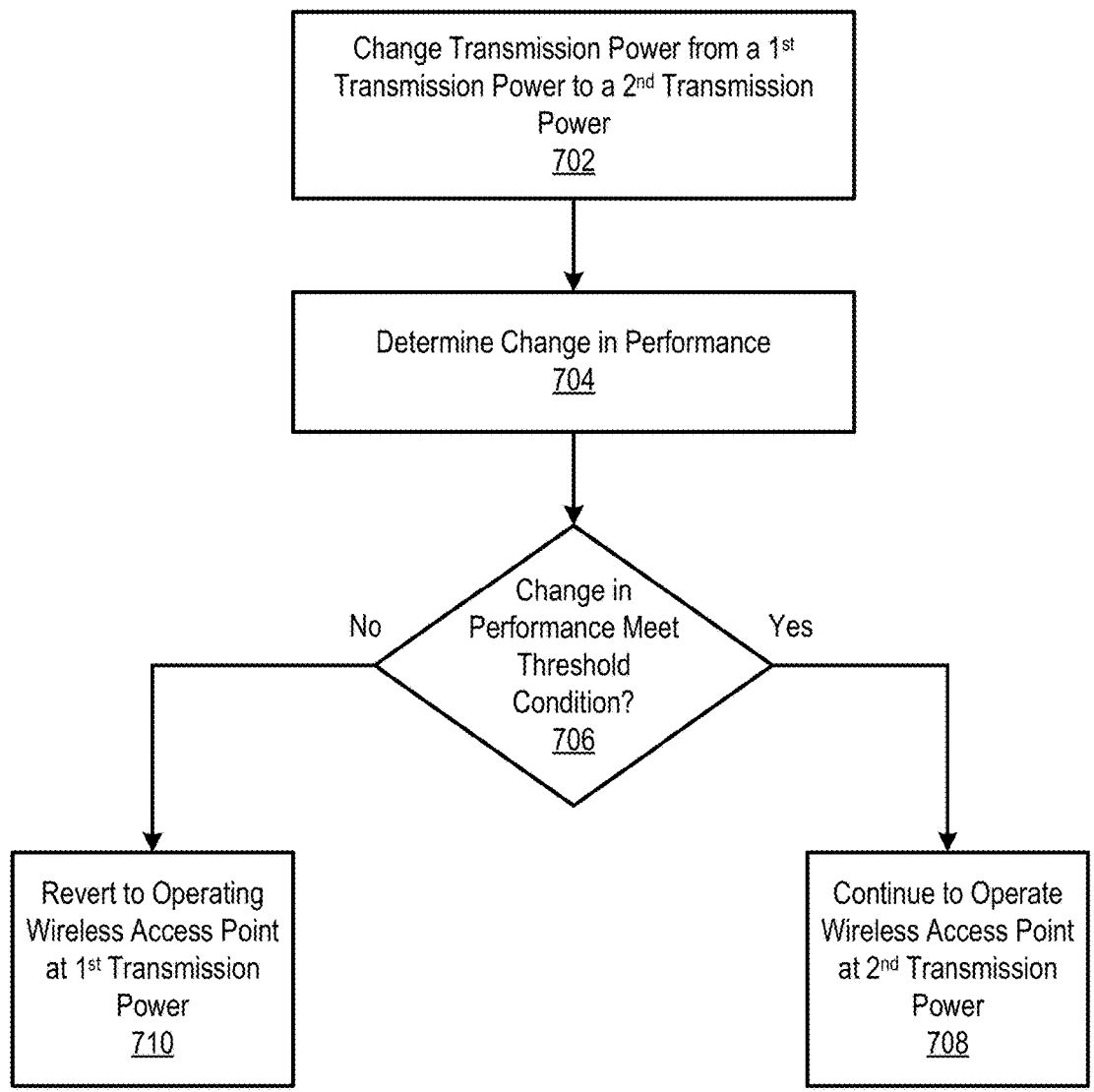
FIG. 7 is a flow chart of another method for automatic management of a wireless access point by adjusting transmission power, according to an embodiment.

FIG. 7 is a flow chart of a method 700, which is another method for automatic management of a wireless access point by adjusting transmission power. Method 700 is executed by some embodiments of wireless access point 202. In a block 702 of method 500, management module 310 changes the transmission power of wireless access point 202 from a first transmission power to a second transmission power. In some embodiments, the second transmission power is lower than the first transmission power, while in some other embodiments, the second transmission power is higher than the first transmission power.

In a block 704 of method 700, management module 310 determines a change in performance of wireless access point 202 in response to the change in transmission power of wireless access point 202 performed in block 702. Examples of block 704 include, but are not limited to, management module 310 determining one or more of (a) change in number of clients associated with wireless access point 202, (b) change in bandwidth of wireless communication links between wireless access point 202 and wireless clients, (c) change in frequency band of wireless communication links between wireless access point 202 and wireless clients, and (d) change in number of wireless communication retries. Management module 310 may evaluate performance of wireless access point 202 and/or its associated network for a predetermined amount of time in block 704, to determine change in performance of wireless access point 202 resulting from the change of block 702.

In a decision block 706 of method 700, management module 310 determines whether the change in performance determined in block 704 meets a threshold condition. Possible examples of the threshold condition include, but are not limited to, one or more of the change in performance determined in block 704 being positive, change in number of wireless clients associated with wireless access point 202 not decreasing by more than a predetermined amount, change in bandwidth of wireless communication links between wireless access point 202 and wireless clients increasing by at least a predetermined amount, and/or no change in frequency bands of wireless communication links.

If the result of decision block 706 is yes, method 700 proceeds to block 708 where management module 310 continues to operate wireless access point 202 at the second transmission power, such that the second transmission power is a new baseline transmission power. If the result of decision block 706 is no, method 700 proceeds to block 710, where management module 310 causes wireless access point 202 to revert to the first transmission power. Method 700 optionally repeats by returning from block 708 or 710 to block 702, after an optional delay analogous to that of block 616 of FIG. 6A. Such optional delay in returning to block 702, along with monitoring time of block 704, may be set to cause management module 310 to change transmission power of wireless access point 202 at a predetermined duty cycle, in a manner similar to that discussed above with respect to block 616.

Figure 8:
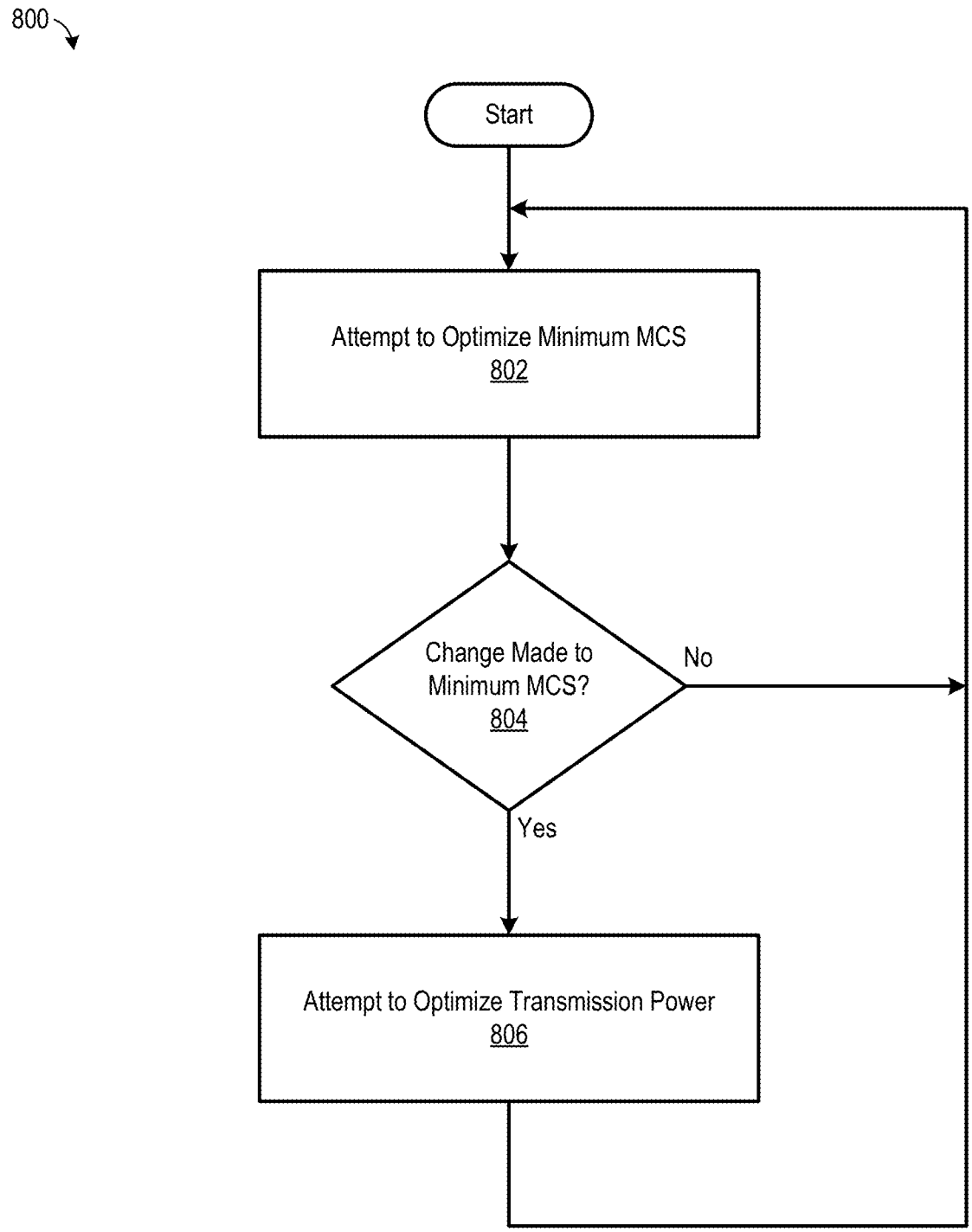
FIG. 8 is a flow chart of a method for automatic management of a wireless access point by adjusting both of minimum modulation coding scheme and transmission power, according to an embodiment.

Referring again to FIG. 3, in some embodiments, management module 310 is configured to adjust a plurality of parameters of wireless access point 202 to optimize its coverage area size. For example, FIG. 8 is a flow chart of a method 800 for automatic management of a wireless access point, which is executed by some embodiments of wireless access point 202. In a block 802 of method 800, management module 310 attempts to optimize minimum modulation coding scheme of wireless access point 202. In one example of block 802, management module 310 executes method 400 or 500 of FIGS. 4 and 5. It should be noted that minimum modulation coding scheme of wireless access point 202 will not necessarily be changed in block 802. For example, management module 310 may terminate block 802 after reaching block 414 or block 426 of method 400 a predetermined number of times without changing minimum modulation coding scheme. Method 800 proceeds from block 802 to a decision block 804 where management module 310 determines whether the minimum modulation coding scheme of wireless access point 202 was changed in block 802. If the result of decision block 804 is no, method 800 returns to block 802. In some embodiments, there is a delay (not shown) between executing decision block 804 and returning to block 802.

If the result of decision block 804 is yes, method 800 proceeds to block 806 where management module 310 attempts to optimize transmission power of wireless access point 202. In one example of block 806, management module 310 executes method 600 or 700. Similar to block 802, it should be noted that transmission power of wireless access point 202 will not necessarily be changed in block 806. For example, management module 310 may terminate block 806 after reaching block 614 or block 626 of method 600 a predetermined number of times without changing transmission power. Method 800 returns to block 802 after executing block 806. However, in some embodiments, there is a delay (not shown) between executing block 806 and returning to block 802.

Figure 9:
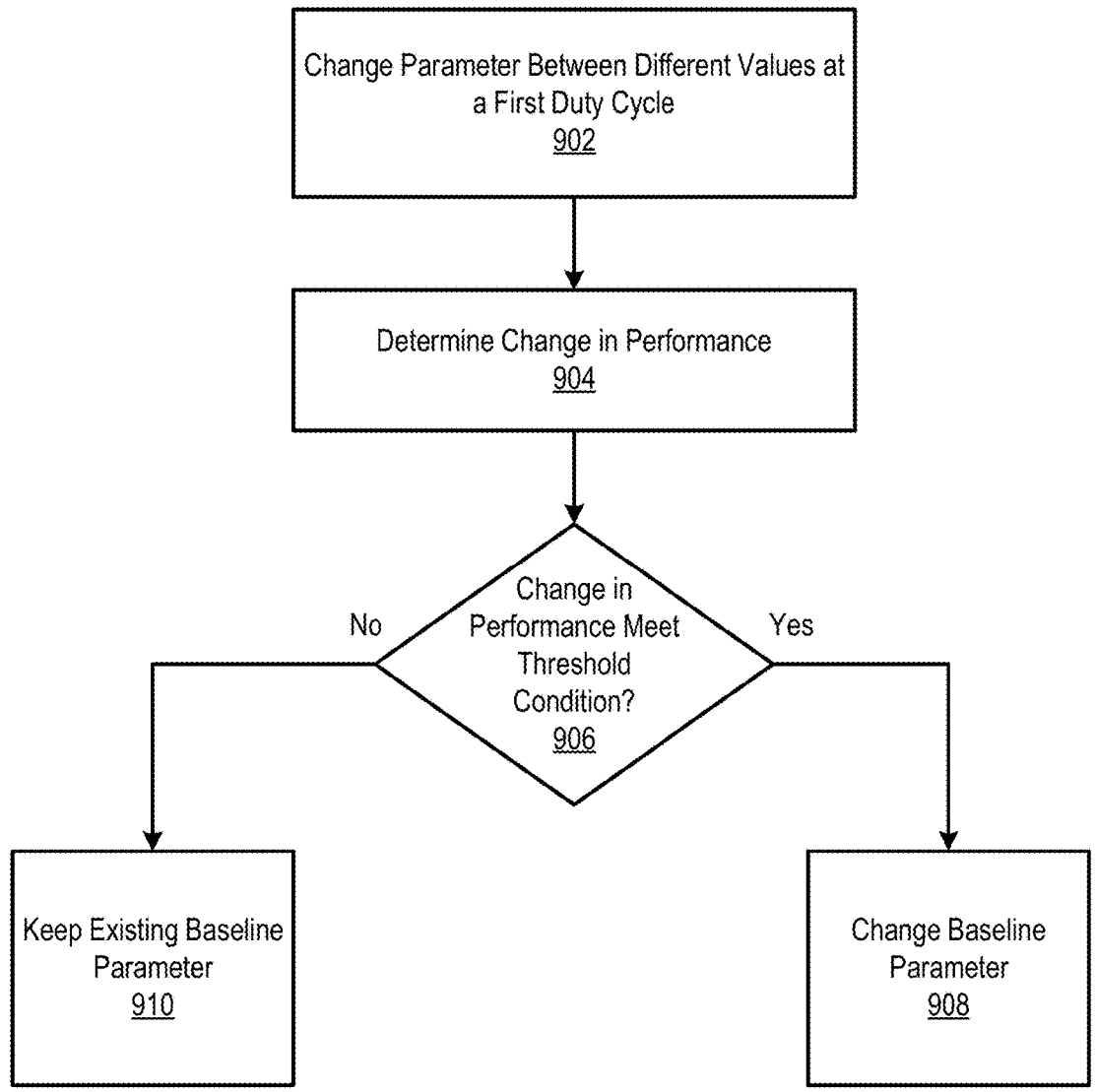
FIG. 9 is a flow chart of another method for automatic management of a wireless access point, according to an embodiment.

FIG. 9 is a flow chart of a method 900 for automatic management of a wireless access point, which is executed by some embodiments of wireless access point 202. In a block 902 of method 900, management module 310 changes a parameter of wireless access point 202 between different values at a first duty cycle. In one example of block 902, management module 310 changes minimum modulation coding scheme of wireless access point 202 between different values by executing method 400 of FIGS. 4A and 4B. In another example of block 902, management module 310 changes transmission power of wireless access point 202 between different values by executing method 600 of FIGS. 6A and 6B. In a block 904 of method 900, management module 310 determines a change in performance of wireless access point 202 in response to changing the parameter of the wireless access point. In one example of block 904, management module 310 determines a change in performance in wireless access point 202 in response to changing minimum modulation coding scheme or transmission power of wireless access point 202.

In a decision block 906 of method 900, management module 310 determines whether the change in performance determined in block 904 meets a threshold condition. In one example of decision block 906, the threshold condition is whether the change in performance determined in block 904 is a positive change in performance of wireless access point 202. If the result of decision block 906 is yes, method 900 proceeds to block 908 where a baseline parameter of wireless access point 202 is changed to the new parameter value resulting from execution of block 902. In one example of block 908, management module 310 sets a baseline minimum modulation coding scheme of wireless access point 202 to a new minimum modulation coding scheme resulting from the change of block 902. In another example of block 908, management module 310 sets a baseline transmission power of wireless access point 202 to a new transmission power resulting from the change of block 902. If the result of decision block 906 is no, method 900 proceeds to block 910 where the existing baseline parameter is kept, or in other words, the baseline parameter is unchanged. In an example of block 908, management module 310 keeps an existing baseline minimum modulation coding scheme or transmission power of wireless access point 202.

Combinations of Features

Features described above may be combined in various ways without departing from the scope hereof. The following examples illustrate some possible combinations.

(A1) A method for automatic management of a wireless access point includes (1) changing a minimum modulation coding scheme of the wireless access point from a first minimum modulation coding scheme to a second minimum modulation coding scheme, (2) determining a first change in performance of the wireless access point in response to changing the minimum modulation coding scheme, and (3) in response to the first change in performance of the wireless access point meeting a first threshold condition, continuing to operate the wireless access point in the second minimum modulation coding scheme.

(A2) In the method denoted as (A1), the second minimum modulation coding scheme may be a higher order modulation coding scheme than the first minimum modulation coding scheme.

(A3) The method denoted as (A2) may further include changing from the first minimum modulation coding scheme to the second minimum modulation coding scheme in response to a previous increase in minimum modulation coding scheme of the wireless access point having a positive impact on performance of the wireless access point.

(A4) In the method denoted as (A1), the second minimum modulation coding scheme may be a lower order minimum modulation coding scheme than the first minimum modulation coding scheme.

(A5) The method denoted as (A4) may further include changing from the first minimum modulation coding scheme to the second minimum modulation coding scheme in response to a previous increase in minimum modulation coding scheme of the wireless access point having a negative impact on performance of the wireless access point.

(A6) In any one of the methods denoted as (A1) through (A5), the first threshold condition may include the first change in performance of the wireless access point being positive.

(A7) In any one of the methods denoted as (A1) through (A6), the first threshold condition may include a predetermined proportion of previous changes in minimum modulation coding scheme of the wireless access point being positive.

(A8) Any one of the methods denoted as (A1) through (A7) may further include (1) changing the minimum modulation coding scheme of the wireless access point from the second minimum modulation coding scheme to a third minimum modulation coding scheme, (2) determining a second change in performance of the wireless access point in response to changing the minimum modulation coding scheme from the second minimum modulation coding scheme to the third minimum modulation coding scheme, and (3) in response to the second change in performance of the wireless access point meeting the first threshold condition, continuing to operate the wireless access point in the third minimum modulation coding scheme.

(A9) Any one of the methods denoted as (A1) through (A8) may further include, after continuing to operate the wireless access point in the second minimum modulation coding scheme, (1) changing a transmission power of the wireless access point from a first transmission power to a second transmission power, (2) determining a second change in performance of the wireless access point in response to changing the transmission power, and (3) in response to the second change in performance of the wireless access point meeting a second threshold condition, continuing to operate the wireless access point at the second transmission power.

(A10) In the method denoted as (A9), the second transmission power may be lower than the first transmission power.

(A11) In any one of the methods denoted as (A9) and (A10), the second threshold condition may include the second change in performance of the wireless access point being positive.

(B1) A method for automatic management of a wireless access point includes (1) changing a transmission power of the wireless access point from a first transmission power to a second transmission power, (2) determining a change in performance of the wireless access point in response to changing the transmission power of the wireless access point from the first transmission power to the second transmission power, and (3) in response to the change in performance of the wireless access point meeting a first threshold condition, continuing to operate the wireless access point at the second transmission power.

(B2) In the method denoted as (B1), the second transmission power may be lower than the first transmission power.

(B3) The method denoted as (B2) may further include changing from the first transmission power to the second transmission power in response to a previous decrease in transmission power of the wireless access point having a positive impact on performance of the wireless access point.

(B4) In the method denoted as (B1), the second transmission power may be higher than the first transmission power.

(B5) In any one of the methods denoted as (B1) through (B4), the first threshold condition may include the change in performance of the wireless access point being positive.

(B6) In any one of the methods denoted as (B1) through (B4), the first threshold condition may include a predetermined proportion of previous changes in transmission power of the wireless access point being positive.

(C1) A method for automatic management of a wireless access point includes (1) repeatedly changing a parameter of the wireless access point between different values at a first duty cycle, (2) determining a change in performance of the wireless access point in response to changing the parameter of the wireless access point, and (3) changing a baseline parameter of the wireless access point in response to the change in performance of the wireless access point meeting a first threshold condition.

(C2) In the method denoted as (C1), the parameter of the wireless access point may include a minimum modulation coding scheme of the wireless access point.

(C3) In any one of the methods denoted as (C1) and (C2), the parameter of the wireless access point may include a transmission power of the wireless access point.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for automatic management of a wireless access point, comprising:
    repeatedly changing a parameter of the wireless access point between different values at a first duty cycle;
    determining a change in performance of the wireless access point in response to changing the parameter of the wireless access point; and
    changing a baseline parameter of the wireless access point in response to the change in performance of the wireless access point meeting a first threshold condition.

2. The method of claim 1, wherein the parameter of the wireless access point comprises a minimum modulation coding scheme of the wireless access point.

3. The method of claim 1, wherein the parameter of the wireless access point comprises a transmission power of the wireless access point.

4. The method of claim 1, further comprising, before repeatedly changing the parameter of the wireless access point between different values at the first duty cycle, determining the baseline performance of the wireless access point.

5. The method of claim 4, wherein determining the baseline performance of the wireless access point comprises determining an average number of wireless clients associated with the wireless access point.

6. The method of claim 4, wherein determining the baseline performance of the wireless access point comprises determining an average data transmission rate of clients associated with the wireless access point.

7. The method of claim 1, wherein the first threshold condition comprises at least a predetermined number of wireless clients previously associated with the wireless access point remaining associated with the wireless access point.

8. The method of claim 1, wherein the first threshold condition comprises an average bandwidth of communication links between the wireless access point and wireless clients increasing by at least a predetermined amount.

9. The method of claim 1, wherein the first threshold condition comprises there being no change in frequency bands of wireless communication links supported by the wireless access point.

10. The method of claim 1, wherein the first threshold condition comprises a change in number of wireless clients associated with wireless access point not decreasing by more than a predetermined amount.

11. The method of claim 1, further comprising repeatedly changing the parameter of the wireless access point between different values at the first duty cycle in response to one or more of (a) actual wireless client behavior and (b) predicted wireless client behavior.

12. A wireless access point, comprising:
an antenna array;
an amplification and filtering module communicatively coupled to the antenna array;
a modulation and demodulation module communicatively coupled to the amplification and filtering module; and
a management module configured to:
repeatedly change a parameter of the wireless access point between different values at a first duty cycle,
determine a change in performance of the wireless access point in response to changing the parameter of the wireless access point, and
change a baseline parameter of the wireless access point in response to the change in performance of the wireless access point meeting a first threshold condition.

13. The wireless access point of claim 12, wherein the parameter of the wireless access point comprises a minimum modulation coding scheme of the wireless access point.

14. The wireless access point of claim 12, wherein the parameter of the wireless access point comprises a transmission power of the wireless access point.

15. The wireless access point of claim 12, wherein the management module is further configured to determine the baseline performance of the wireless access point, before repeatedly changing the parameter of the wireless access point between different values at the first duty cycle.

16. The wireless access point of claim 15, wherein determining the baseline performance of the wireless access point comprises determining an average number of wireless clients associated with the wireless access point.

17. The wireless access point of claim 15, wherein determining the baseline performance of the wireless access point comprises determining an average data transmission rate of clients associated with wireless access point.

18. The wireless access point of claim 12, wherein the first threshold condition comprises at least a predetermined number of wireless clients previously associated with the wireless access point remaining associated with the wireless access point.

19. The wireless access point of claim 12, wherein the first threshold condition comprises an average bandwidth of communication links between the wireless access point and wireless clients increasing by at least a predetermined amount.

20. The wireless access point of claim 12, wherein the first threshold condition comprises there being no change in frequency bands of wireless communication links supported by the wireless access point.

* * * * *